(12) United States Patent
Yonemoto et al.

(10) Patent No.: US 12,136,730 B2
(45) Date of Patent: Nov. 5, 2024

(54) MODIFIED POSITIVE ELECTRODE MATERIAL AND PREPARATION METHOD THEREFOR, AND LITHIUM ION BATTERY

(71) Applicants: Microvast Power Systems Co., Ltd., Zhejiang (CN); Microvast, Inc., Stafford, TX (US)

(72) Inventors: Bryan Yonemoto, Clearwater, FL (US); Huijie Guo, Zhejiang (CN); Wenjuan Liu Mattis, Zhejiang (CN)

(73) Assignees: Microvast Power Systems Co., Ltd., Huzhou (CN); Microvast, .Inc., Stafford, TX (US)

( * ) Notice: Subject to any disclaimer, the term of this patent is extended or adjusted under 35 U.S.C. 154(b) by 196 days.

(21) Appl. No.: 17/535,602

(22) Filed: Nov. 25, 2021

(65) Prior Publication Data
US 2023/0163275 A1 May 25, 2023

(51) Int. Cl.
*H01M 4/36* (2006.01)
*C01G 53/00* (2006.01)
(Continued)

(52) U.S. Cl.
CPC ............ *H01M 4/366* (2013.01); *C01G 53/50* (2013.01); *H01M 4/505* (2013.01); *H01M 4/525* (2013.01);
(Continued)

(58) Field of Classification Search
CPC ...... H01M 4/366; H01M 4/505; H01M 4/525; H01M 2004/028; H01M 4/0471;
(Continued)

(56) References Cited

U.S. PATENT DOCUMENTS

| 2015/0357638 A1* | 12/2015 | Sun | ........................ H01M 4/366 429/231.95 |
| 2017/0092935 A1* | 3/2017 | Sun | ........................ C01G 53/006 |

(Continued)

FOREIGN PATENT DOCUMENTS

WO WO-2022131572 A1 * 6/2022

OTHER PUBLICATIONS

Choi et al., machine translation of WO2022131572A1, Jun. 23, 2022 (Year: 2022).*

(Continued)

*Primary Examiner* — James M Erwin
*Assistant Examiner* — John S Medley
(74) *Attorney, Agent, or Firm* — Samson G. Yu

(57) ABSTRACT

The disclosure provides a modified positive electrode material, a preparation method therefor, and a lithium ion battery. The modified positive electrode material includes a core and a coating layer. The core contains Mn and Ni, the coating layer includes a first oxide coating layer coating on a surface of the core. A first element forming the first oxide coating layer is selected from one or more of a group of Si, Ti, V, Zr, Mo, W, Bi, Nb, and Ru. The first element with a high-valent state can partially enter the surface core structure of the positive electrode material to occupy the sites of manganese ions, and form a chemical bond stronger than a Mn—O. Thus, O and Mn in the core structure are difficult to precipitate, and the coating layer is difficult to fall off in cycle process. Moreover, structural stability of the modified positive electrode material is improved.

13 Claims, 4 Drawing Sheets

(51) Int. Cl.
  *H01M 4/505* (2010.01)
  *H01M 4/525* (2010.01)
  *H01M 4/02* (2006.01)
(52) U.S. Cl.
  CPC ...... *C01P 2004/03* (2013.01); *C01P 2006/40* (2013.01); *H01M 2004/028* (2013.01)
(58) Field of Classification Search
  CPC ...... H01M 4/131; H01M 4/1391; H01M 4/36; H01M 4/62; H01M 10/052; H01M 10/0525; C01G 53/50; C01G 53/42; C01G 53/00; C01G 53/006; C01P 2004/03; C01P 2006/40; C01P 2002/52; C01P 2004/16; C01P 2004/50; C01P 2004/51; C01P 2004/61; C01P 2004/80; C01P 2004/82; Y02E 60/10
  USPC .......................................................... 429/223
  See application file for complete search history.

(56) References Cited

U.S. PATENT DOCUMENTS

| | | | |
|---|---|---|---|
| 2017/0229742 A1* | 8/2017 | Aykol | H01M 4/505 |
| 2018/0212237 A1* | 7/2018 | Lee | H01M 10/0525 |
| 2019/0044135 A1* | 2/2019 | Du | H01M 4/621 |
| 2020/0335784 A1* | 10/2020 | Tong | H01M 10/0525 |

OTHER PUBLICATIONS

Lee et al., Optimized Electrochemical Performance of Ni Rich LiNi0.91Co0.06Mn0.03O2 Cathodes for High-Energy Lithium Ion Batteries, Jun. 20, 2019, Scientific Reports, 9, pp. 1 and 2 (Year: 2019).*

* cited by examiner

MODIFIED POSITIVE ELECTRODE MATERIAL AND PREPARATION METHOD THEREFOR, AND LITHIUM ION BATTERY

TECHNICAL FIELD

The disclosure relates to the technical field of lithium ion batteries, and in particular to a modified positive electrode material and a preparation method therefor, and a lithium ion battery.

BACKGROUND

Lithium-ion batteries are widely used in communications devices, laptops and electronic energy storage devices due to their high operating voltage, low self-discharge effect and excellent cycle performance. Compared with the fuel vehicle, the battery electric vehicle is less competitive in endurance mileage. As the volume of electronic products becomes smaller and smaller, the requirements for the batteries' endurance mileage of electronic products are also getting higher. That is to say the volume energy density of the positive electrode material of the lithium ion battery is requested to be higher, and thus it is urgent to improve the electrochemical capacity of the positive electrode material. Moreover, the compaction density of the positive electrode material is also required to be higher.

Currently, the common high-voltage positive electrode material is lithium cobalt oxides. Being a high-voltage positive electrode material, single crystals of lithium cobalt oxides have an extremely high compaction density and a relatively excellent cycle performance at a high temperature. However, with a costly cobalt element, the lithium cobalt oxide positive electrode material has a high preparation cost, while the nickel-cobalt-manganese positive electrode material has a low cost and a high electrochemical capacity.

The ratio of nickel element, cobalt element and manganese element in common positive electrode material is adjustable, and previous studies have shown that the specific electrochemical capacity of the positive electrode material is gradually increased with the increase of the nickel content in the positive electrode material. That is to say the high-nickel positive electrode material has higher specific capacity. However, when the content of the nickel element on the surface of the positive electrode material is high, during the charging and discharging process of the lithium ion batteries, $Ni^{4+}$ ions will cause the high nickel positive electrode material with high-delithiation state to become unstable, and the reaction between $Ni^{4+}$ and the organic electrolyte will increase the impedance and degrade the cycle performance of the lithium ion batteries. Besides, the increase of the voltage will lead to the damage to the microcosmic crystal structure of the high-nickel positive electrode material, accompanied by oxygen gas evolution, transition metal dissolution, the increase of surface and interface side reactions, etc. The problems described above will further lead to the degradation of the electrochemical capacity and the electrochemical performance, as well as the safety performance of the high-nickel positive electrode material.

SUMMARY

A main objective of the disclosure is to provide a modified positive electrode material, preparation method therefor, and a lithium ion battery, so as to solve the problem that in the prior art, it is challengeable for a lithium ion battery formed by a high-capacity positive electrode material (for example, 0.1 C, 220 mAh/g) to have excellent cycle stability at a high voltage (for example, 2.7 to 4.5V).

In order to realize the objective described above, in one aspect, the disclosure provides a modified positive electrode material, including: a core and a coating layer, the core being a positive electrode material containing a manganese element and a nickel element, the coating layer including a first oxide coating layer, the first oxide coating layer coating on a surface of the core, and a first element forming the first oxide coating layer being selected from one or more of a group consisting of Si, Ti, V, Zr, Mo, W, Bi, Nb, and Ru.

The first element forming the first oxide coating layer is selected from one or more of a group consisting of Mo, W, and Bi.

The total mole number of the core is m, and the mole number of the first oxide coating layer is greater than 0% m and smaller than or equal to 5% m.

The modified positive electrode material further includes: a second oxide coating layer, the second oxide coating layer coating on the surface of the core, and being arranged between a positive electrode material and the first oxide coating layer, and a second element forming the second oxide coating layer being selected from elements of Group IVB and/or Group VB.

The second element forming the second oxide coating layer is selected from one or more of a group consisting of Ti, V, and/r.

The total mole number of the core is m, and the mole number of the second oxide coating layer is 0.01% m to 3.00% m.

The core is a concentration gradient spherical particle; and from inside to outside in a radial direction, a mole percentage of the nickel element in all metal elements is gradually decreased, and a mole percentage of the manganese element in all the metal elements is gradually increased.

A radius of the core is R; in a surface layer of the core, a mole percentage of a nickel element is 0% to 60% of the total mole number of all metal elements in the surface layer, and a mole percentage of a manganese element is 10% to 100% of the total mole number of all the metal elements in the surface layer; in an interior of the core, a mole percentage of a nickel element is 60% to 100% of the total mole number of all metal elements in the interior, and a mole percentage of a manganese element is 0% to 10% of the total mole number of all the metal elements in the interior; and the interior refers to a portion from a spherical center to R/2 in the radial direction of a spherical particle, and the surface layer refers to a portion from R/2 to R in the radial direction of the spherical particle.

The modified positive electrode material is denoted by the following general formula: $Li_{1+i}Ni_xCo_yMn_{(1-x-y)}M_mO_2 \cdot [MO_2]_n$, $-0.05 \leq i \leq 0.2$, $0.5 \leq x \leq 0.8$, $0.05 \leq y \leq 0.3$, $0 \leq z \leq 0.3$, $0 \leq m \leq 0.03$, and $0 \leq n \leq 0.05$.

In order to realize the objective described above, in another aspect, the disclosure provides a preparation method for the above-described modified positive electrode material provided by the disclosure. The preparation method for the modified positive electrode material includes: providing a positive electrode material particle containing a manganese element and a nickel element, and performing a mechanical fusion treatment on a first oxide and the positive electrode material particle containing the manganese element and the nickel element to obtain the modified positive electrode material, where a first element of the first oxide is selected from one or more of a group consisting of Si, Ti, V, Zr, Mo, W, Bi, Nb, and Ru.

The preparation method for the modified positive electrode material further includes: performing a first heat treatment after the mechanical fusion treatment, to obtain the modified positive electrode material, while a temperature is 100 to 300° C., and a time of the first heat treatment is 3 to 5 h.

Additionally, the preparation method for the modified positive electrode material includes: providing a precursor particle containing a nickel element and a manganese element, mixing the precursor particle containing the nickel element and the manganese element with a lithium source, and performing a sintering treatment; water-washing a product obtained after the sintering treatment, and adding a salt formed by a second element in a water-washing process; performing a second heat treatment after the water-washing process, to obtain a particle coated with a second oxide coating layer; and performing a mechanical fusion treatment on the particle coated with the second oxide coating layer and a first oxide to obtain the modified positive electrode material, where a first element of the first oxide is selected from one or more of a group consisting of Si, Ti, V, Zr, Mo, W, Bi, Nb, and Ru, and a second element of the salt formed by the second element and a second element of a second oxide are each selected from elements of Group IVB and/or Group VB.

A temperature of the second heat treatment is 200 to 900° C., or 300 to 700° C., and a sintering time of the second heat treatment is 1 to 20 h, or 3 to 12 h.

A metal element of a second metal salt is selected from one or more of a group consisting of Ti, V, and Zr.

The modified positive electrode material is obtained through first heat treatment after the mechanical fusion treatment, while a temperature of the first heat treatment is 100 to 300° C., and a time of the first treatment is 3 to 5 h.

In order to realize the objective described above, in still another aspect, the disclosure provides a lithium ion battery, including a positive electrode, the positive electrode including the above-described modified positive electrode material provided by the disclosure.

By applying a technical solution of the disclosure, a surface of the positive electrode material (core) containing the manganese element and the nickel element is coated with the first oxide coating layer, and thus, an oxygen element and the manganese element in a core structure are difficult to evolve. In addition, the coating layer is firmly locked on the surface of the core, so as to be difficult to fall off in a cycle process. Moreover, the first oxide coating layer may further prevent an electrolyte by-product from corroding the core in the cycle process, thereby improving structural stability of the modified positive electrode material at a high voltage (for example, 2.7 to 4.5V). It also improves a cycle performance and a safety performance of the modified positive electrode material and the lithium ion battery formed by the modified positive electrode material. Besides, the modified positive electrode material described above also has a low preparation cost owing to a low content of the cobalt element.

BRIEF DESCRIPTION OF THE DRAWINGS

The accompanying drawings of the description, which form a part of the disclosure, are used to provide further understanding of the disclosure, and schematic embodiments of the disclosure and the description thereof are used to explain the disclosure, which are not intended to unduly limit the disclosure. In the accompanying drawings.

DETAILED DESCRIPTION OF THE EMBODIMENTS

Figure 1:
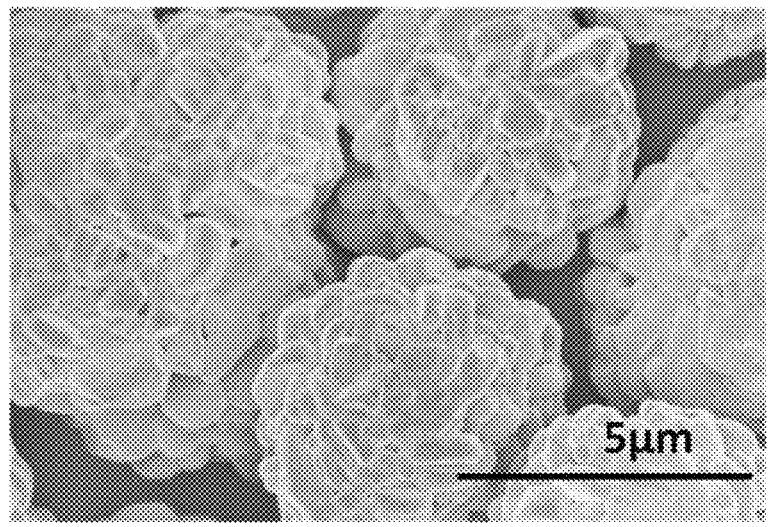
FIG. 1 shows a scanning electron microscope (SEM) image of a positive electrode material $Li_{1.02}Ni_{0.75}Co_{0.2}Mn_{0.05}O_2$ prepared in Embodiment 1 of the disclosure.

It should be noted that the embodiments in the disclosure and features in the embodiments may be combined with one another without conflict. The disclosure will be described in detail below in conjunction with the embodiments.

As described in the background art, it is challengeable for an existing positive electrode material to have both a high capacity (for example, 0.1 C, 220 m Ah/g) and excellent cycle stability at a high voltage (for example, 2.7 to 4.5V). In order to solve the technical problem described above, the disclosure provides a modified positive electrode material, including: a core and a coating layer, the core described above being a positive electrode material containing a manganese element and a nickel element, the coating layer described above including a first oxide coating layer, the first oxide coating layer coating on a surface of the core, and a first element forming the first oxide coating layer including, but not limited to, one or more of a group consisting of Si. Ti, V, Zr, Mo, W, Bi, Nb, and Ru.

A surface of the positive electrode material (core) containing the manganese element and the nickel element is coated with the first oxide coating layer, the coating layers include a specific type of first oxide coating layer which may be replaced with manganese, and the first element with a high valence state may at least partially enter the surface core structure of the positive electrode material and occupy the sites of manganese ions. The first element with the high-valent state may form, with oxygen ions, a chemical bond stronger than a Mn—O bond, and thus an oxygen element and the manganese element in the core structure described above are difficult to evolve. In addition, the coating layer is firmly locked on the surface of the core, so as to be difficult to fall off in a cycle process. Moreover, the first oxide coating layer may further prevent an electrolyte by-product from corroding the positive electrode material (core) in the cycle process, thereby improving structural stability of the modified positive electrode material at a high voltage (for example, 2.7 to 4.5V), so as to further improve cycle performance and safety performance of the modified positive electrode material and a lithium ion battery formed by the modified positive electrode material. Besides, the modified positive electrode material described above also has a low preparation cost owing to a low content of the cobalt element.

In some embodiments of the disclosure, a high-capacity positive electrode material refers to a positive electrode material with a first discharge capacity greater than 200 mAh/g at a voltage of 2.7 to 4.5V at 0.10 in a button battery test, for example, 200 to 230 mAh/g.

In one embodiment, the first element forming the first oxide coating layer includes, but is not limited to, one or more of a group consisting of Mo, W, and Bi. The specific type of first element described above is conducive to formation of corresponding high-valent state ions, so as to form pores when the first element enters a high-manganese low-nickel outer layer structure, thereby further inhibiting oxygen evolution, so as to further improve the structural stability of the positive electrode material.

When the coating amount of a first oxide is too low, part of the surface of the positive electrode material as the core will be exposed, and the coating layer is likely to dissolve and fall off after being corroded by an electrolyte for a long time, which makes it impossible to protect the core by the first oxide coating layer. On the contrary, when the coating amount is too high, it will affect the Lit transport on the positive electrode surface, resulting in that it is difficult to exert an electrochemical specific capacity of the core and affect the electrochemical performance of the core. In one embodiment, the total mole number of the core is m, and the mole number of the first oxide coating layer is greater than 0% m and smaller than or equal to 5% m. The mole number of the first oxide coating layer includes, but is not limited to, a range described above, and limiting the mole number within the range described above is conducive to further improvement of a fixing effect of oxygen atoms and manganese atoms in the positive electrode material containing the manganese element and the nickel element, thereby further improving the structural stability of the modified positive electrode material, and further inhibiting a side reaction between the modified positive electrode material and the electrolyte, so as to improve the cycle performance and the safety performance of the modified positive electrode material.

In one embodiment, the modified positive electrode material further includes a second oxide coating layer, the second oxide coating layer coating the surface of the core, and being arranged between the core and the first oxide coating layer, and a second element forming the second oxide coating layer including, but not limited to, elements of (Group IVB and/or Group VB. The second oxide coating layer may repair the surface of the core and enter a high-manganese low-nickel outer layer structure through ion migration, so as to inhibit a Li element from migrating to the surface to form residual lithium again, thereby improving the structural stability, the cycle performance, and the safety of the modified positive electrode material.

In order to improve the structural stability of the modified positive electrode material, so as to improve its cycle performance and safety performance, in one embodiment, the second element forming the second oxide coating layer includes, but is not limited to, one or more of a group consisting of Ti, V, and Zr.

In order to improve the structural stability of the modified positive electrode material, so as to improve its cycle performance and safety performance, in one embodiment, the total mole number of the core is m, and the mole number of the second oxide coating layer is 0.01% m to 3.00% m.

In one embodiment, the core is a concentration gradient material; and from inside to outside in a radial direction, a mole percentage of the nickel element in all metal elements is gradually decreased, and a mole percentage of the manganese element in all the metal elements is gradually increased. The core with specific element distribution may protect structure stability of a high-nickel portion. The surface of the core is coated with a specific type of oxide coating layer, and a high-valent state element of the coating layer may partially enter the high-manganese low-nickel outer layer structure and occupy the sites of manganese ions. The high-valent state element of the coating layer may form, with oxygen ions, a chemical bond stronger than a Mn—O bond, and thus an oxygen element and a manganese element in the high-manganese low-nickel outer layer structure are difficult to evolve, thereby improving the structural stability of the positive electrode material. Under a synergistic effect of two factors described above, it is difficult for the core to generate a side reaction with the electrolyte, thereby significantly improving the cycle performance and the safety performance of the modified positive electrode material and the lithium ion battery formed by the modified positive electrode material. Besides, the modified positive electrode material described above also has a low preparation cost owing to a low content of the cobalt element.

In order to further increase a specific capacity and improve thermal stability and structural stability of the core, so as to improve cycle stability, in one embodiment, a radius of the core is R; in a surface layer of the core, a mole percentage of a nickel element is 0% to 60% of the total mole number of all metal elements in the surface layer, and a mole percentage of a manganese element is 10% to 100% of the total mole number of all the metal elements in the surface layer; in an interior of a ternary positive electrode material, a mole percentage of a nickel element is 60% to 100% of the total mole number of all metal elements in the interior, and a mole percentage of a manganese element is 0% to 10% of the total mole number of all the metal elements in the interior; and the interior refers to a portion from a spherical center to R/2 in the radial direction of a spherical particle, and the surface layer refers to a portion from 4/5R to R in the radial direction of the spherical particle. The term, spherical particle, in the disclosure refers to a spherical particle or a spherical-like particle.

In order to further increase the specific capacity and improve the thermal stability and the structural stability of the core, based on a percentage of a total content of the manganese element in the core, a content of the manganese element in the surface layer of the ternary positive electrode material is 95% to 100%, and a content of manganese elements at remaining positions is 0% to 5%.

In order to further increase the specific capacity and improve the thermal stability and the structural stability of the core, so as to improve the cycle stability, or, based on a percentage of the total mole number of the nickel element in the core, a content of the nickel element in the surface layer of the core is 0% to 60% and a content of nickel elements at remaining positions is 40% to 100%; and based on a percentage of the total mole number of the manganese element in the core, a content of the manganese element in the surface layer of the core is 99% to 100%, and a content of manganese elements at remaining positions is 0% to 1%.

In one embodiment, the modified positive electrode material may be denoted by the following general formula $Li_{1+i}Ni_xCo_yMn_{(1-x-y)}M_mO_2 \cdot [MO_2]_n$, $-0.05 \leq i \leq 0.2$, $0.5 \leq x \leq 0.8$, $0.05 \leq y \leq 0.3$, $0 \leq z \leq 0.3$, $0 \leq m \leq 0.03$, and $0 \leq n \leq 0.05$. The modified positive electrode material containing the specific components described above has an excellent comprehensive performance including the structural stability, the thermal stability, the cycle stability, etc.

In the second aspect, the disclosure provides a preparation method for a modified positive electrode material. The preparation method for a modified positive electrode material includes: provide a positive electrode material particle containing a manganese element and a nickel element, and perform a mechanical fusion treatment on a first oxide and the positive electrode material particle containing the manganese element and the nickel element, to obtain the modified positive electrode material, where a first element of the first oxide includes, but is not limited to, one or more of a group consisting of Si, Ti, V, Zr, Mo, W, Bi, Nb, and Ru.

By the mechanical fusion method described above, a high-valent state element in a first oxide coating layer may be directly fused to a surface of the positive electrode material. In a fusion process, part of the first element in the first oxide coating layer is replaced with some manganese element on a surface layer of the positive electrode material particle containing the manganese element and the nickel element, and thus a chemical bond firmer than a Mn—O bond is formed on the surface layer of the positive electrode material described above, and the first oxide coating layer and a core of an inner layer are more tightly combined together. Further, after mechanical fusion treatment for coating, heat treatment may not be required, or only a low heat treatment temperature and a short heat treatment time are used, and thus most of the first element of the surface layer is kept on the surface layer of the positive electrode material to stabilize the surface layer, instead of being diffused to an interior.

In particular, in the preparation method for the positive electrode material with a concentration gradient structure provided by the disclosure, when subsequent heat treatment time is too long or temperature is too high, transition metal elements (for example, one or more of nickel, cobalt, and manganese) in the positive electrode material will be diffused in a large range. Consequently, the locally-added first element for stabilizing the surface layer in the disclosure may not be formed, and original concentration gradient distribution of the entire positive electrode material is affected.

In one embodiment, the preparation method for the modified positive electrode material further includes: perform a first heat treatment after the mechanical fusion treatment, to obtain the modified positive electrode material, while a temperature is 100 to 300° C., and a time of the first heat treatment is 3 to 5 h. The temperature and the time of the first heat treatment include, but are not limited to, the ranges described above, and limiting the temperature and the time within the ranges described above is conducive to not only improvement of uniformity of a crystal form of the first oxide coating layer, so as to improve comprehensive electrochemical performance of the modified cathode material, while also improvement of a bonding force between the first oxide coating layer and the core of the positive electrode material, so as to improve a coating effect of the first oxide coating layer. In order to improve the comprehensive electrochemical performance of the positive electrode material and the coating effect of the first oxide coating layer, a temperature of the first heat treatment is 200 to 300° C.

In one embodiment, the preparation method for a modified positive electrode material includes: provide a precursor particle containing a nickel element and a manganese element, mix the precursor particle containing the nickel element and the manganese element with a lithium source, and perform a sintering treatment; water-wash a product obtained after the sintering treatment, and add a salt formed by a second element in a water-washing process; perform a second heat treatment after the water-washing process, to obtain a particle coated with a second oxide coating layer; and perform a mechanical fusion treatment on the particle coated with the second oxide coating layer and a first coating oxide to obtain the modified positive electrode material, where an element of the first coating oxide includes, but is not limited to, one or more of a group consisting of Si, Ti, V, Zr, Mo, W, Bi, Nb, and Ru, and the salt formed by the second element and a second element of a second coating oxide respectively include, but are not limited to, elements of Group IVB and/or Group VB.

The positive electrode material precursor particle containing nickel and manganese described above is mixed with the lithium source and sintered, to obtain the positive electrode material particle containing a lithium element. By water-washing the above-described positive electrode material containing the lithium element obtained after the sintering treatment, a residual lithium hydroxide and/or lithium carbonate may be dissolved in water to remove residual lithium, and the dissolved residual lithium may precipitate metal in a solution on a surface of the positive electrode material particle containing the lithium element.

The second heat treatment may decompose hydroxide precipitate while a second oxide coating layer and a particle coated with a second oxide are formed under an action of oxygen gas. Compared with other types, the specific type of second element described above is conducive to inhibit the lithium from precipitating and reduce a content of the residual lithium, so as to further improve structural stability of the positive electrode material.

By the mechanical fusion method described above, a high-valent state element in a first oxide coating layer may be directly fused to a surface of the positive electrode material. In a fusion process, at least part of the first element in the first oxide coating layer is substituted with a manganese element on a surface layer of the positive electrode material particle containing the manganese element and the nickel element. Thus a chemical bond firmer than a Mn—O bond is formed on the surface layer of the positive electrode material described above, and the oxide coating layer and a core of an inner layer are more tightly combined together. Further, after the mechanical fusion treatment for coating, heat treatment may not be required, or only a low heat treatment temperature and a short heat treatment time are used, and thus most of the first element of the surface layer is kept on the surface layer of the positive electrode material to stabilize the surface layer, instead of being diffused to an interior. Besides, the modified positive electrode material described above also has a low preparation cost owing to a low content of the cobalt element.

In order to distribute the hydroxide precipitate more uniformly on the surface of the core, to facilitate subsequent formation of the second oxide coating layer with a uniform thickness and facilitate increase of a reaction rate of a coprecipitation reaction in the water-washing process, preferably, a temperature in the water-washing process is 10 to 30° C.

The positive electrode material described above may be a core-shell ternary positive electrode material or a concentration gradient ternary positive electrode material, where the ternary positive electrode material is a nickel-cobalt-manganese ternary positive electrode material. A Ni element in the nickel-cobalt-manganese ternary positive electrode material may provide a high specific capacity, a Mn element may improve thermal stability and structural stability, and a Co element may reduce cation mixing. Gradient material design for the core of the nickel-cobalt-manganese positive electrode material may exert a synergistic effect of the nickel, cobalt, and manganese elements, so as to ensure an excellent cycle stability and a thermal stability, apart from increase of a discharge specific capacity.

The above-described positive electrode material containing the manganese element and the nickel element or the precursor particle containing the nickel and the manganese provided by the disclosure may be purchased in the market or synthesized by the self.

As an embodiment, the positive electrode material containing the manganese element and the nickel element may be a positive electrode material with a core-shell structure and containing a manganese element, a cobalt element, and a nickel element. As another embodiment, the positive electrode material with the core-shell structure and containing the manganese element, the cobalt element, and the nickel element is a positive electrode material precursor with a core-shell structure and containing a manganese element, a cobalt element, and a nickel element before being mixed with lithium in a preparation process. As provided in the disclosure, a preparation method for a ternary positive electrode material with a core-shell structure includes: prepare, in a molar ratio of a nickel element to a cobalt element to a manganese element of (0.6~ 1):(0~0.4):(0~0.1), a first salt solution containing the nickel element, the cobalt element, and the manganese element, where the sum of respective molar ratios of the nickel element, the cobalt element, and the manganese element is 1; add a deionized aqueous solution with ammonia into a reaction kettle, add the first salt solution, a precipitator, and a complexant into the reaction kettle introduced with inert gas, and perform a first coprecipitation reaction, to obtain an intermediate of the ternary positive electrode material; prepare, in a molar ratio of a nickel element to a cobalt element to a manganese element of (0~0.6):(0.1~ 0.8):(0.1~1), a second salt solution containing the nickel element, the cobalt element, and the manganese element; then add the second salt solution, a precipitator, and a complexant into the reaction kettle containing the intermediate of the ternary positive electrode material in inert gas, and perform a second coprecipitation reaction, to obtain a ternary precursor particle (that is, a positive electrode material precursor with a core-shell structure which contains a manganese element, a cobalt element, and a nickel element), where the sum of respective molar ratios of the nickel element, the cobalt element, and the manganese element described above is 1; and mix the ternary precursor particle with a lithium source, and then perform the first sintering treatment and water-washing, to obtain the ternary positive electrode material with the core-shell structure.

The first salt solution, the precipitator, and the complexant are subjected to the first coprecipitation reaction described above, to obtain the high-nickel low-manganese intermediate of the ternary positive electrode material. On this basis, the second salt solution, the intermediate of the ternary positive electrode material, the precipitator, and the complexant are subjected to the second coprecipitation reaction, and thus hydroxide precipitate containing nickel, cobalt, and manganese elements generated from the reaction may grow on a surface of an intermediate particle of the ternary positive electrode material continuously, and finally form a ternary precursor with a core-shell structure. In this process, the prepared ternary precursor has the characteristic of the core-shell structure by controlling contents of the nickel elements and the manganese elements individually in the first salt solution and the second salt solution, and thus the core of the nickel-cobalt-manganese ternary positive electrode material prepared subsequently has a high discharge specific capacity, an excellent cycle stability and a thermal stability.

Compared with other ranges, limiting the molar ratio of the nickel element, the cobalt element and the manganese element in the first salt solution within the range described above is conducive to not only accurate control over a content of a transition metal element in the intermediate of the ternary positive electrode material, but also increase of a generation rate of the intermediate of the ternary positive electrode material. It causes that a high nickel content and a low manganese content is contained in an interior of the ternary positive electrode material (core) containing the manganese element and the nickel element prepared subsequently. Thereby an electrochemical specific capacity of the ternary positive electrode material with the core-shell structure is increased.

Compared with other ranges, limiting the molar ratio of the nickel element, the cobalt element and the manganese element in the second salt solution within the range described above is conducive to not only accurate control over a concentration gradient of the content of the transition metal element in the ternary positive electrode material (core) containing the manganese element and the nickel element, but also increase of a generation rate of the ternary positive electrode material with the core-shell structure. It causes that a high manganese content and a low nickel content is contained in a surface of the ternary positive electrode material containing the manganese element and the nickel element prepared subsequently. Thereby a thermal stability of the ternary positive electrode material containing the manganese element and the nickel element is increased.

In one embodiment, in the first coprecipitation reaction, a pH is 10 to 12.5 and a reaction temperature is 40 to 60° C. In order to further improve thermal stability of a core, or, the pH of the first coprecipitation reaction includes, but is not limited to, 11 to 12.2.

In one embodiment, the complexant includes, but is not limited to, one or more of a group consisting of an ammonia, ammonium carbonate, and ammonium acetate, and the precipitator includes, but is not limited to, one or more of a group consisting of sodium hydroxide, sodium carbonate, and sodium bicarbonate.

As an embodiment, the positive electrode material containing the manganese element and the nickel element may be a positive electrode material with a concentration gradient structure and containing a manganese element, a cobalt element, and a nickel element. As another embodiment, the positive electrode material with the concentration gradient structure and containing the manganese element, the cobalt element, and the nickel element is a positive electrode material precursor with a concentration gradient structure and containing a manganese element, a cobalt element, and a nickel element before mixed with lithium in a preparation process. As provided in the disclosure, a preparation method for a ternary positive electrode material with a concentration gradient structure includes: prepare, in a molar ratio of a nickel element to a cobalt element to a manganese element of (0.6~1):(0~0.4):(0~0.1), a first salt solution containing the nickel element, the cobalt element, and the manganese element, and add same into a first storage tank, where the sum of respective molar ratios of the nickel element, the cobalt element, and the manganese element described above is 1; prepare, in a molar ratio of a nickel element to a cobalt element to a manganese element of (0~0.6):(0.1~0.8):(0.1~1), a second salt solution containing the nickel element, the cobalt element, and the manganese element, and add same into a second storage tank, where the sum of respective molar ratios of the nickel element, the cobalt element, and the manganese element described above is 1; connect the first storage tank to the second storage tank in series, and connect the first storage tank to a reaction kettle; add a deionized aqueous solution with ammonia into the reaction kettle, and, through a pump in an inert gas atmosphere, a mixed salt solution in the first storage tank, a precipitator, and a complexant convey into the reaction kettle simultaneously; convey, through a pump, the salt solution in the second storage tank into the first storage tank, and perform a reaction to obtain to a ternary precursor with a concentration gradient structure (that is, a positive electrode material precursor with a concentration gradient structure and containing a manganese element, a cobalt element, and a nickel element); and mix the nickel-cobalt-manganese ternary positive electrode precursor with a lithium source, and then perform the first sintering treatment, to obtain the ternary positive electrode material with the concentration gradient structure.

The first storage tank is connected to the second storage tank in series, the second storage tank convey the second salt solution to the first storage tank continuously in a reaction process, and a content of a metal salt of the salt solution in the first storage tank will be continuously changed. The first storage tank is connected with the reaction kettle to make the first salt solution react with the precipitator and the complexant to obtain the ternary positive electrode material precursor with a nickel content from high to low and a manganese content from low to high.

A pH value and a complexing speed of a reaction are controlled by controlling an adding speed of the precipitator and the complexant, and thus hydroxide precipitate containing nickel, cobalt, and manganese elements generated from the reaction grows on a surface of an intermediate particle of the ternary positive electrode material continuously, and finally form the ternary positive electrode material with the concentration gradient structure. In the process described above, the prepared ternary precursor has the characteristic of the concentration gradient structure by controlling relative contents of the nickel elements and the manganese elements in the first salt solution and the second salt solution, and thus a core of the nickel-cobalt-manganese positive electrode material prepared subsequently has a high discharge specific capacity, as well as excellent cycle stability and thermal stability.

Compared with other ranges, limiting the molar ratio of the nickel element, the cobalt element and the manganese element in the first salt solution within the range described above is conducive to control over a content of a transition metal element in an intermediate of the ternary positive electrode material accurately. It causes that a high nickel content and a low manganese content is contained in an interior of the subsequently-prepared ternary positive electrode material which contains the manganese element and the nickel element. Thereby an electrochemical specific capacity of the ternary positive electrode material with the concentration gradient structure is increased.

Compared with other ranges, limiting the molar ratio of the nickel element, the cobalt element and the manganese element in the second salt solution within the range described above is conducive to accurately control over a concentration gradient of the content of the transition metal element in the ternary positive electrode material containing the manganese element and the nickel element. It causes that a high manganese content and a low nickel content is contained in a surface of the subsequently-prepared ternary positive electrode material containing the manganese element and the nickel element. Thereby a thermal stability of the ternary positive electrode material containing the manganese element and the nickel element is increased. In one embodiment, in a second co-precipitation reaction, a pH is 10 to 125, and a reaction temperature is 40 to 60° C. In order to further improve thermal stability of the core, or, the pH of the second coprecipitation reaction includes, but is not limited to, 11 to 12.2.

In one embodiment, a chemical formula of the ternary precursor particle described above may be: $Ni_xCo_yMn_{(1-x-y)}(OH)_2$, $0.65 \leq x \leq 1$, $0.1 \leq y \leq 0.4$, and D50 is 5 to 25 µm. The D50 of the ternary precursor particle includes, but is not limited to, the range described above, and limiting the D50 within the range described above is conducive to more uniform heating during a subsequent sintering process, so as to improve mixing uniformity with the lithium source, and further improve a first sintering treatment effect.

In one embodiment, the sintering treatment includes a first sintering stage, a second sintering stage and a third sintering stage, where a temperature and time of the first sintering stage are 300 to 550° C. and 1 to 8 h respectively, a temperature and time of the second sintering stage are 600 to 800° C. and 5 to 20 h respectively, a temperature and time of the third sintering stage are 700 to 1000° C. and 1 to 15 h respectively, and a temperature rise rate in a sintering treatment process is 5 to 10° C./min. The temperature, the time, and the temperature rise rate of the sintering treatment include, but are not limited to, the ranges described above, and limiting the temperature, the time, and the temperature rise rate within the ranges described above is conducive to increase of purity of crystal of the core of the prepared nickel-cobalt-manganese positive electrode material and further exertion of comprehensive electrochemical performance of the nickel-cobalt-manganese positive electrode material.

In one embodiment, a molar ratio of the ternary precursor particle to the lithium source is 1:(0.95~1.2). Compared with other ranges, limiting the molar ratio of the ternary precursor particle to the lithium source within the range described above may obtain a core with a specific chemical composition of the ternary positive electrode material, and enable the modified ternary positive electrode material prepared subsequently to contain sufficient lithium ions, so as to exert the electrochemical specific capacity of the modified ternary positive electrode material in a charge and discharge process. In order to further exert the electrochemical specific capacity of the modified ternary positive electrode material, a molar ratio of the ternary precursor particle to the lithium source is 1:(0.97~1.1).

In one embodiment, a molar ratio of the second element to the core of the ternary positive electrode material is (0.1~2):100. The molar ratio of the second element and the core of the ternary positive electrode material includes, but is not limited to, the range described above, and limiting the molar ratio within the range described above is conducive to formation of a strong chemical bond through the second element with a proper dosage and oxygen ions with a specific quantity, which enables a second coating layer to form a firmer coating. Simultaneously, Li element is further inhibited from migrating to the surface to form residual lithium again, and the structural stability and the cycle performance of the modified ternary positive electrode material are improved.

In order to inhibit the precipitation of the lithium element and then reduce a content of the residual lithium, so as to improve the structural stability of the positive electrode material, in one embodiment, a temperature of a second heat treatment is 200 to 900° C., or 300 to 700° C., and a sintering time of the second heat treatment is 1 to 20 h, or 3 to 12 h.

In order to improve the structural stability of the modified ternary positive electrode material, in one embodiment, a second element forming a salt includes, but is not limited to, one or more of a group consisting of Ti, V, and Zr.

In order to inhibit the fusion result getting worse caused by metal diffusion, in one embodiment, the modified ternary positive electrode material is obtained through a first heat treatment after mechanical fusion treatment, while a temperature of the first heat treatment is 100 to 300° C. and a time of the first heat treatment is 3 to 5 h.

In the fourth aspect, the disclosure further provides a lithium ion battery, including a positive electrode, where the positive electrode includes a modified positive electrode material provided by the disclosure. The above-described modified positive electrode material provided by the disclosure has excellent structural stability at a high voltage (for example, 2.7 to 4.5V), to enable the lithium ion battery to have excellent cycle stability and safety, and excellent electrochemical performance at the high voltage (for example, 2.7 to 4.5V).

In addition, the modified positive electrode material described above has a low preparation cost owing to a low content of a cobalt element, and thus the lithium ion battery also has a low preparation cost.

In one embodiment, a negative electrode of the lithium ion battery may use Li, C, Si/C, $SiO_x$ or the like as an active material of the negative electrode.

The disclosure is described in further detail below in conjunction with the specific embodiments which are not to be construed as limiting the scope of protection claimed by the disclosure.

It should be noted that in the disclosure, modified positive electrode materials prepared in the embodiments and the comparative embodiment are assembled into button batteries and 5 Ah pouch batteries and conduct electrochemical performance tests.

A preparation process for a button battery includes: take a prepared modified positive electrode material as a positive electrode active material, and mix it with a conductive carbon and a polyvinylidene fluoride (PVDF) in a weight ratio of 90:5:5 with N-methyl-2-pyrrolidone (NMP) as a disperser, and use a high-speed mixer for mixing and getting a slurry, then coat the slurry on an aluminum foil current collector. Perform rolling to prepare a positive electrode piece, then assemble the positive pole piece, negative pole piece (lithium piece), and a separator into a button battery in the glove box, inject an electrolyte into the button battery, seal, and then stand for 10 h, finally conduct the electrochemical performance test.

A preparation process for a 5 Ah pouch battery includes: take a prepared modified positive electrode material as a positive electrode active material, and mix it with conductive carbon and PVDF in a weight ratio of 90:5:5 with NMP as a disperser, and mix into a slurry, And coat the slurry on an aluminum foil current collector, and perform rolling to prepare a positive electrode piece. Then assemble the positive electrode piece, a negative electrode piece (graphite), and a separator into a 5 Ah pouch battery in a glove box, inject an electrolyte into the 5 Ah pouch battery. Seal, and then stand for 10 h, finally conduct the electrochemical performance test.

In order to improve first efficiency and energy density of the battery, in one embodiment, a pro-lithiation step is added into a preparation process of the 5 Ah pouch battery.

EMBODIMENTS

Embodiment 1

A preparation method for a modified ternary positive electrode material includes:

(1) Preparation of a ternary precursor with a concentration gradient structure: Prepare, in a molar ratio of a nickel element to a cobalt element of 0.8:0.2, 15 L of first salt solution with a total concentration of transition metal cations of 2 mol/L.

Prepare, in a molar ratio of a nickel element to a cobalt element to a manganese element of 0.6:0.2:0.2, 5 L of second salt solution with a concentration of transition metal cations of 2 mol/L.

Prepare 10 mol/L sodium hydroxide (precipitator) aqueous solution and 13 mol/L ammonia (complexant) aqueous solution separately for later use.

Add 12.5 L of 0.6 mol/L ammonia aqueous solution (base solution) into a reaction kettle, keep a temperature in the reaction kettle at a constant temperature of 50° C., introduce nitrogen gas into the reaction kettle, stir the base solution at a stirring speed of 500 rpm, and adjust the pH of the base solution to 11.7 with sodium hydroxide solution.

Enable, through constant flow pumps at a constant speed, the prepared first salt solution, the 13 mol/L ammonia aqueous solution, and the 10 mol/L sodium hydroxide aqueous solution described above to flow into the reaction kettle in parallel separately, and start a co-precipitation reaction, where the pH of a precipitation reaction system is 11.7, and a constant flow rate of the first salt solution is 16.6 mL/min. Meanwhile, at a constant flow rate of 4.16 mL/min, the prepared second salt solution described above to flow into 15 L of first salt solution, to ensure that the first salt solution and the second salt solution described above are added completely at the same time.

Control a flow rate of the ammonia to keep a concentration of the ammonia in the entire reaction system unchanged at 0.6 mol/L, and control the introduction quantity of the sodium hydroxide aqueous solution to keep the pH value in a second coprecipitation reaction process unchanged at 11.7. Stop the second coprecipitation reaction after 20 h, then wash and dry to obtain the ternary precursor $Ni_{0.75}Co_{0.2}Mn_{0.05}(OH)_2$ with the concentration gradient structure.

(2) Preparation of a ternary positive electrode material with a concentration gradient structure:

Weigh, in a molar ratio of 1:1.02, the prepared ternary precursor with the concentration gradient structure, $Ni_{0.75}Co_{0.2}Mn_{0.05}(OH)_2$, and a lithium hydroxide separately, and then mix same, where mixing time is 8 min, and a rotating speed in a mixing process is 800 rpm. Perform sintering treatment after mixing, and introduce oxygen gas. During the sintering treatment, a temperature and time of a first sintering stage are 500° C. and 5 h respectively, a temperature and time of a second sintering stage are 720° C. and 10 h respectively, a temperature and time of a third sintering stage are 800° C. and 5$h$ respectively, and a temperature rise rate is 5° C./min. Crush and sieve (with a sieving aperture of 300 meshes) a sintered product in sequence after sintering, so as to obtain the ternary positive electrode material with the concentration gradient structure, $Li_{1.02}Ni_{0.75}Co_{0.2}Mn_{0.05}O_2$. A microcosmic morphology of the ternary positive electrode material is shown in FIG. 1, D50 being 6.7 μm.

(3) Preparation of a Modified Ternary Positive Electrode Material:

Water-wash the ternary positive electrode material with the concentration gradient structure during stirring, and add a zirconium nitrate aqueous solution during water-washing, where a molar ratio of the ternary positive electrode material with the concentration gradient structure to zirconium nitrate is 100:0.15, the volume of the zirconium nitrate aqueous solution is 3.5 L, and the reaction temperature is 25° C. Stop stirring after a water-washing process is performed for 0.5 min, and dry a filter cake obtained after filtration to obtain a product.

Perform second sintering treatment on the obtained product described above. A temperature of the second sintering treatment is 680° C. Sinter the product for 5 h, and then perform natural cooling and sieving (with a sieving aperture of 400 meshes) to obtain a second sintered product containing Zr element. A molar ratio of zirconium oxide (second oxide) to a core of the ternary positive electrode material is 0.15:100.

Figure 2:
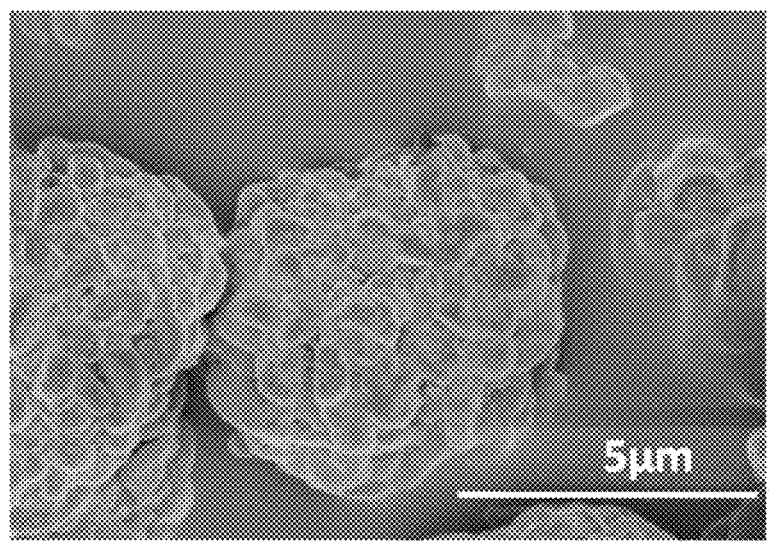
FIG. 2 shows an SEM image of a modified positive electrode material prepared in Embodiment 1 of the disclosure.

Mechanically fuse, in a mechanical fusion apparatus (fusion machine from Wuxi Xin Guang Powder Co., Ltd.), the second sintered product containing the Zr element with a titanium dioxide (first metal oxide), to obtain the modified ternary positive electrode material $Li_{1.02}Ni_{0.75}Co_{0.2}Mn_{0.05}Zr_{0.0015}O_2 \cdot [TiO_2]0.01$, where a molar ratio of the titanium dioxide to the core is 1:100, the coating amount of $TiO_2$ is 1% and the coating amount of a Zr oxide is 0.15% based on a percentage content in the total mole number of the core. A surface morphology of the ternary positive electrode material is shown in FIG. 2, D50 of a secondary particle formed by agglomerating short rod-like primary particles being 6.5 μm. Compared with FIG. 1, a morphology of the secondary particle obtained after mechanical fusion treatment is basically the same as that of a material without mechanical fusion treatment.

Embodiment 2

A preparation method for a modified ternary positive electrode material includes:

(1) Preparation of a Ternary Precursor with a Concentration Gradient Structure:

Prepare, in a molar ratio of a nickel element to a cobalt element of 0.9:0.1, 10 L of first salt solution with a total concentration of transition metal cations of 2 mol/L.

Prepare, in a molar ratio of a nickel element to a cobalt element to a manganese element of 0.6:0.3:0.1, 10 L of second salt solution with a concentration of transition metal cations of 2 mol/L.

Prepare 10 mol/L sodium hydroxide (precipitator) aqueous solution and 13 mol/L ammonia (complexant) aqueous solution separately for later use.

Add 12.5 L of 0.6 mol/L ammonia aqueous solution (base solution) into a reaction kettle, keep a temperature in the reaction kettle at a constant temperature of 50° C., introduce nitrogen gas into the reaction kettle, stir the base solution at a stirring speed of 500 rpm, and adjust the pH of the base solution to 11.7 with sodium hydroxide solution.

Enable, through constant flow pumps at a constant speed, the prepared first salt solution, the 13 mol/L ammonia aqueous solution, and the 10 mol/L sodium hydroxide aqueous solution described above to flow into the reaction kettle in parallel separately, and start a first coprecipitation reaction; and meanwhile, at a constant flow rate of 8.3 mL/min, the prepared second salt solution described above to flow into the first salt solution, to ensure that the first salt solution and the second salt solution described above are added completely at the same time. A constant flow rate of the first salt solution is 16.6 mL/min, and a pH in a first coprecipitation reaction process is 11.7.

Control a flow rate of an ammonia to keep a concentration of the ammonia in an entire reaction system unchanged at 0.6 mol/L, and control the introduction quantity of the sodium hydroxide aqueous solution to keep a pH value in the reaction process unchanged at 11.7. Stop a second coprecipitation reaction after 20 h, and wash and dry to obtain the ternary precursor in a gradient type.

Step (2) and step (3) in Embodiment 2 are the same as those in Embodiment 1 respectively, and finally the modified nickel-cobalt-manganese ternary positive electrode material $Li_{1.02}Ni_{0.75}Co_{0.2}Mn_{0.05}Zr_{0.0015}O_2 \cdot [TiO_2]_{0.001}$ is prepared. The coating amount of $TiO_1$ is 1% and the coating amount of a Zr oxide is 0.15% based on a percentage content in the total mole number of a core of the nickel-cobalt-manganese positive electrode material.

Figure 4:
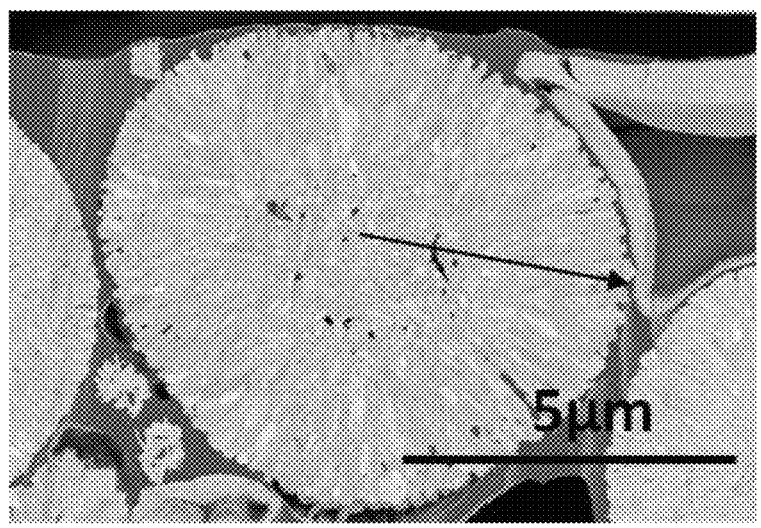
FIG. 4 shows a sectional SEM image of a modified positive electrode material prepared in Embodiment 2 of the disclosure.

A sectional scanning electron microscope (SEM) image of the prepared ternary positive electrode material containing a manganese element and a nickel element is shown in FIG. 4, and the prepared modified ternary positive electrode material described above has a particle diameter of 11.5 μm.

Figure 5:
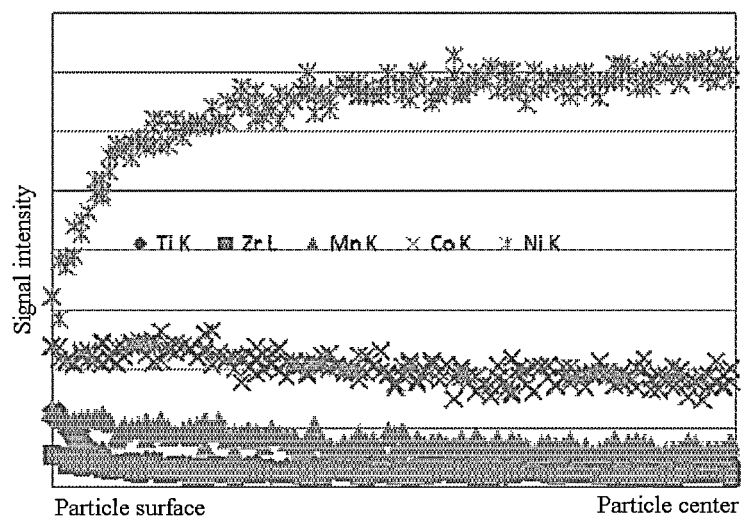
FIG. 5 shows an elements change diagram of section of the modified positive electrode material prepared in Embodiment 2 of the disclosure.

As can be seen from FIG. 5, after coating with a zirconium oxide and a titanium oxide, a content of the nickel element is gradually decreased, and contents of the manganese element and a cobalt element are gradually increased in a direction from inside to outside of a radius of a modified nickel-cobalt-manganese ternary positive electrode material particle. Therefore, gradient design of the positive electrode material may be successfully realized through the preparation method described above, and the gradient structure will not be affected before and after coating treatment.

Embodiment 3

Step (1) and step (2) are the same as those in Embodiment 1 respectively. Embodiment 3 differs from Embodiment 1 in step (3): prepare a modified ternary positive electrode material: Mechanically fuse, in a mechanical fusion apparatus (fusion machine from Wuxi Xin Guang Powder Co., Ltd.), an obtained ternary positive electrode material (core) with a concentration gradient structure with a titanium dioxide, to obtain a modified ternary positive electrode material $Li_{1.02}Ni_{0.75}Co_{0.2}Mn_{0.05}O_2 \cdot [TiO_2]_{0.01}$, where a molar ratio of the titanium dioxide to the core is 1:100.

Calcine the obtained modified ternary positive electrode material $Li_{1.02}Ni_{0.75}Co_{0.2}Mn_{0.05}O_2 \cdot [TiO_2]_{0.01}$ described above in an oxygen gas atmosphere at 200° C. for 5 h, and perform natural cooling and sieving (with a sieving aperture of 400 meshes) to obtain the modified ternary positive electrode material $Li_{1.02}Ni_{0.75}Co_{0.2}Mn_{0.05}O_2 \cdot [TiO_2]_{0.01}$, where the coating amount of $TiO_2$ is 1% based on a percentage content in the total mole number of the core.

Embodiment 4

Step (1) and step (2) are the same as those in Embodiment 2 respectively. Embodiment 4 differs from Embodiment 1 in step (3): prepare a modified ternary positive electrode material: Mechanically fuse, in a mechanical fusion apparatus (fusion machine from Wuxi Xin Guang Powder Co., Ltd.), an obtained ternary positive electrode material (core) with a concentration gradient structure with a titanium dioxide, to obtain a modified ternary positive electrode material $Li_{1.02}Ni_{0.75}Co_{0.2}Mn_{0.05}O_2\cdot[TiO_2]_{0.01}$, where a molar ratio of the titanium dioxide to the core is 1:100.

Embodiment 5

Embodiment 5 differs from Embodiment 1 in that: in a first salt solution, a molar ratio of a nickel element to a cobalt element to a manganese element is 0.6:0.4:0, and in a second salt solution, a molar ratio of a nickel element to a cobalt element and a manganese element is 0.6:0.1:0.3.

A chemical formula of a ternary precursor with a concentration gradient structure prepared in the embodiment is $Ni_{0.6}Co_{0.325}Mn_{0.075}(OH)_2$.

Embodiment 6

Embodiment 6 differs from Embodiment 1 in that: in a first salt solution, a molar ratio of a nickel element to a cobalt element to a manganese element is 1:0:0, and in a second salt solution, a molar ratio of a nickel element to a cobalt element and a manganese element is 0:0.8:0.2 A chemical formula of a ternary precursor with a concentration gradient structure prepared in the embodiment is $Ni_{0.6}Co_{0.325}Mn_{0.075}(OH)_2$.

Embodiment 7

Embodiment 7 differs from Embodiment 1 in that: water-wash a ternary positive electrode material with a concentration gradient structure, and add an vanadium sulfate hexahydrate aqueous solution during water-washing, where a molar ratio of the ternary positive electrode material with the concentration gradient structure to vanadium sulfate hexahydrate is 100:0.25; and perform second sintering treatment on a water-washed product, to coat a surface of the ternary positive electrode material (core) with the concentration gradient structure with a layer of an oxide of V, to obtain a second sintered product, where a second metal element is V.

Embodiment 8

Embodiment 8 differs from Embodiment 1 in that: water-wash a ternary positive electrode material with a concentration gradient structure, and add a mixed aqueous solution of titanium sulfate and zirconium sulfate in a water-washing process, where a molar ratio of the ternary positive electrode material with the concentration gradient structure to a titanium element to a zirconium element is 100:0.5:0.5; and perform second sintering treatment on a water-washed product, to coat a surface of the ternary positive electrode material (core) with the concentration gradient structure with a layer of oxides of Ti and Zr, to obtain a second sintered product, where second metal elements are Ti and Zr. A chemical formula of a modified ternary positive electrode material prepared in the embodiment is $Li_{1.02}Ni_{0.75}Co_{0.2}Mn_{0.05}Ti_{0.005}Zr_{0.005}O_2$, where the coating amount of a second oxide coating layer is 1.00% based on a percentage content in the total mole number of the core.

Embodiment 9

Embodiment 9 differs from Embodiment 1 in that: a first oxide coating layer is $SiO_2$.

The coating amount of $SiO_2$ is 0.30% based on a percentage content in the total mole number of a ternary positive electrode material (core) with a concentration gradient structure.

Embodiment 10

Embodiment 10 differs from Embodiment 1 in that: a first metal oxide is $MoO_3$, and a first metal element is Mo.

The coating amount of $MoO_3$ is 0.50% based on a percentage content in the total mole number of a ternary positive electrode material (core) with a concentration gradient structure.

Embodiment 11

Embodiment 11 differs from Embodiment 1 in that: a first metal oxide is $Bi_2O_3$, and a first metal element is Bi.

The coating amount of $Bi_2O_3$ is 0.30% based on a percentage content in the total mole number of a ternary positive electrode material (core) with a concentration gradient structure.

Embodiment 12

Embodiment 12 differs from Embodiment 1 in that: a first oxide coating layer is $RuO_2$.

The coating amount of $RuO_2$, the first oxide coating layer, is 0.50% based on a percentage content in the total mole number of a ternary positive electrode material (core) with a concentration gradient structure.

Embodiment 13

Embodiment 13 differs from Embodiment 1 only in that: the coating amount of a first oxide coating layer is 5.00%.

Embodiment 14

Embodiment 14 differs from Embodiment 1 only in that: the coating amount of a first oxide coating layer is 6.00%.

Comparative Embodiment 1

(1) Prepare a ternary precursor with a concentration gradient structure as in Embodiment 1.

(2) Preparation of a ternary positive electrode material with a concentration gradient structure:

Weigh, in a molar ratio of 1:1.02, the prepared ternary precursor with the concentration gradient structure and a lithium hydroxide separately, and then mix, where mixing time is 8 min, and a rotating speed in a mixing process is 800 rpm. Then perform sintering treatment and introduce oxygen gas. During the sintering treatment, a temperature and time of a first sintering stage are 500° C. and 5 h respectively, a temperature and time of a second sintering stage are 720° C. and 10 h respectively, a temperature and time of a third sintering stage are 800° C. and 5 h respectively, and a temperature rise rate is 5° C./min. Crush and sieve (with a sieving aperture of 300 meshes) a sintered product in sequence after sintering, to obtain the ternary positive electrode material $Li_{1.02}Ni_{0.75}Co_{0.2}Mn_{0.05}O_2$.

Figure 3:
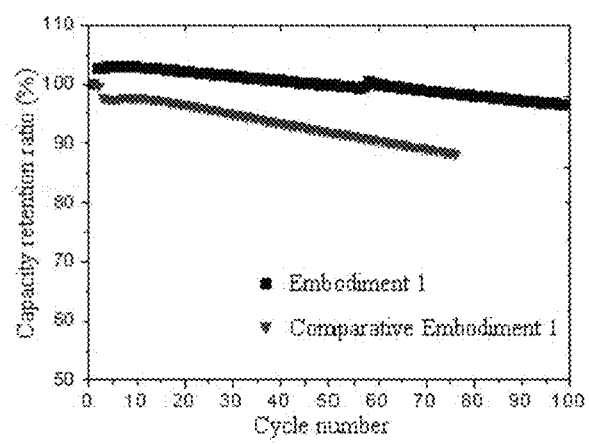
FIG. 3 is a comparison diagram of discharge characteristics of the modified positive electrode material $Li_{1.02}Ni_{0.75}Co_{0.2}Mn_{0.05}Zr_{0.0015}O_2 \cdot [TiO_2]_{0.01}$ prepared in Embodiment 1 of the disclosure and a positive electrode material $Li_{1.02}Ni_{0.75}Co_{0.2}Mn_{0.05}O_2$ prepared in Comparative Embodiment 1.

The modified positive electrode material $Li_{1.02}Ni_{0.75}Co_{0.2}Mn_{0.05}Zr_{0.0015}O_2\cdot[TiO_2]_{0.01}$ prepared in Embodiment 1 of the disclosure and the ternary positive electrode material $Li_{1.02}Ni_{0.75}Co_{0.2}Mn_{0.05}O_2$ prepared in Comparative Embodiment 1 are assembled into 5 Ah pouch batteries separately for cycle performance comparison, and a comparison diagram is shown in FIG. 3. As can be seen from FIG. 3, a capacity retention rate of the 5 Ah pouch battery in Embodiment 1 is always superior to that of Comparative Embodiment 1, which indicates that cycle performance may be improved by the modified ternary positive electrode material prepared in Embodiment 1. Test conditions of the cycle performance include: charge and discharge at 0.5 C at a high temperature (45° C.) of 2.7 to 4.45V.

It should be noted that (1) the modified positive electrode materials prepared in the embodiments and the comparative embodiment of the disclosure are assembled into the button batteries and subjected to battery capacity tests. Test conditions include: charge and discharge at 0.1 C at a normal temperature of 27 to 4.5V, and test results are shown in Table 1.

(2) The modified positive electrode materials prepared in the embodiments and the comparative embodiment of the disclosure are assembled into the 5 Ah pouch batteries and conduct specific capacity and cycle performance tests (a capacity retention rate after 70 cycles) at 0.2 C. Test conditions of a capacity grading discharge specific capacity at 0.2 C include: a cycle performed at 0.2 C three times at a normal temperature of 2.7 to 4.45V, where a discharge specific capacity of the third time is taken as a test result of the capacity grading discharge specific capacity at 0.2 C in the disclosure; and test conditions of cycle performance include: charge and discharge at 0.5 C at a high temperature (45° C.) of 2.7 to 4.45V, and test results are shown in Table 1.

TABLE 1

| | Button battery First discharge specific capacity at 0.1 C (mAh/g) | 5 Ah pouch battery | |
|---|---|---|---|
| | | Capacity grading discharge specific capacity at 0.2 C (mAh/g) | Capacity retention ratio after 70 cycles (%) |
| Embodiment 1 | 217 | 201 | 95.0 |
| Embodiment 2 | 218 | 202 | 95.5 |
| Embodiment 3 | 217 | 201 | 96.0 |
| Embodiment 4 | 217 | 202 | 95.0 |
| Embodiment 5 | 205 | 180 | 98.0 |
| Embodiment 6 | 218 | 203 | 94.0 |
| Embodiment 7 | 219 | 204 | 94.5 |
| Embodiment 8 | 220 | 205 | 93.0 |
| Embodiment 9 | 215 | 199 | 92.0 |
| Embodiment 10 | 218 | 201 | 95.0 |
| Embodiment 11 | 219 | 203 | 95.5 |
| Embodiment 12 | 220 | 205 | 96.0 |
| Embodiment 13 | 210 | 196 | 90.0 |
| Embodiment 14 | 206 | 190 | 89.0 |
| Comparative Embodiment 1 | 217 | 200 | 88.0 |

In view of the description above, it may be seen that the embodiments described above of the disclosure has the following technical effects:

By comparing Embodiment 1 with Comparative Embodiment 1, it may be found that the capacity retention rate of the pouch battery formed by assembling the modified positive electrode material prepared in Embodiment 1 is 95.0%, which is significantly higher than 88.0% in Comparative Embodiment 1, and increased by 8% or so. It is indicated that the surface of the positive electrode material (core) containing the manganese element and the nickel element is coated with the first oxide coating layer, the coating layers include the specific type of first oxide coating layer which may be substituted with the manganese, and the first element with the high-valent state may at least partially enter the surface layer core structure of the positive electrode material and occupy the sites of the manganese ions. The first element with the high-valent state may form, with the oxygen ions, the chemical bond stronger than the Mn—O bond, and thus the oxygen element and the manganese element in the core structure described above are difficult to precipitate. In addition, the coating layer is firmly locked on the surface of the positive electrode material, so as to be difficult to fall off in the cycle process. Moreover, the first oxide coating layer may further prevent the electrolyte by-product from corroding the positive electrode material (core) in the cycle process, thereby improving the structural stability of the modified positive electrode material at the high voltage (for example, 2.7 to 4.5V), so as to further improve the cycle performance and the safety performance of the modified positive electrode material and the lithium ion battery formed by the modified positive electrode material.

It should be noted that the terms "first", "second", etc. in the description and claims of the disclosure are used to distinguish similar objects, but are not necessarily used to describe a specific sequence or a precedence order. It should be understood that the terms so used are interchangeable under appropriate circumstances so that the embodiments of the disclosure described herein may be implemented in an order rather than those described herein, for example.

What is described above are merely the preferred embodiments of the disclosure and is not intended to limit the disclosure, which may be modified and changed, for those skilled in the art. Any modifications, equivalent replacements, improvements, etc. made within the spirit and principles of the disclosure should fall within the scope of protection of the disclosure.

What is claimed is:

1. A modified positive electrode material, comprising:
a core, the core being a positive electrode material containing a manganese element and a nickel element; and
a coating layer, the coating layer comprising a first oxide coating layer, the first oxide coating layer coating on a surface of the core by a mechanical fusion treatment, and a first element forming the first oxide coating layer comprising, one or more of a group consisting of Si, Ti, V, Zr, Mo, W, Bi, Nb, and Ru;
the modified positive electrode material further comprising: a second oxide coating layer, the second oxide coating layer coating on a surface of the core, and being arranged between the positive electrode material and the first oxide coating layer, and a second element forming the second oxide coating layer being selected from elements of Group IVB and/or Group VB;
the modified positive electrode material is denoted by the following general formula: $Li_{1+i}Ni_xCo_yMn_{(1-x-y)}M_mO_2 \cdot [MO_2]_n$, $-0.05 \leq i \leq 0.2$, $0.5 \leq x \leq 0.8$, $0.05 \leq y \leq 0.3$, $0 \leq m \leq 0.03$, and $0 \leq n \leq 0.05$, wherein M of $Li_{1+i}Ni_xCo_yMn_{(1-x-y)}M_mO_2$ represents the second element, and M of $[MO_2]_n$ represents the first element.

2. The modified positive electrode material according to claim 1, wherein the first element forming the first oxide coating layer is selected from one or more of a group consisting of Mo, W, and Bi.

3. The modified positive electrode material according to claim 1, wherein a total mole number of the core is m, and a mole number of the first oxide coating layer is greater than 0% m and smaller than or equal to 5% m.

4. The modified positive electrode material according to claim 1, wherein the second element forming the second oxide coating layer is selected from one or more of a group consisting of Ti, V, and Zr.

5. The modified positive electrode material according to claim 1, wherein a total mole number of the core is m, and a mole number of the second oxide coating layer is 0.01% m to 3.00% m.

6. The modified positive electrode material according to claim 1, wherein the core is a concentration gradient spherical particle; and from inside to outside in a radial direction, a mole percentage of the nickel element in all metal elements is gradually decreased, and a mole percentage of the manganese element in all the metal elements is gradually increased.

7. The modified positive electrode material according to claim 6, wherein a radius of the core is R; in a surface layer of the core, a mole percentage of the nickel element is 0% to 60% of a total mole number of all metal elements in the surface layer, and a mole percentage of the manganese element is 10% to 100% of the total mole number of all the metal elements in the surface layer; in an interior of the core, a mole percentage of the nickel element is 60% to 100% of a total mole number of all metal elements in the interior, and a mole percentage of the manganese element is 0% to 10% of the total mole number of all the metal elements in the interior; and the interior refers to a portion from a spherical center to R/2 in the radial direction of the spherical particle, and the surface layer refers to a portion from R/2 to R in the radial direction of the spherical particle.

8. A preparation method for the modified positive electrode material according to claim 1, comprising: providing a precursor particle containing the nickel element and the manganese element, mixing the precursor particle containing the nickel element and the manganese element with a lithium source, and performing a sintering treatment; water-washing a product obtained after the sintering treatment, and adding a salt formed by a second element in the water-washing: performing a second heat treatment after the water-washing, to obtain a particle coated with a second oxide coating layer; and performing the mechanical fusion treatment on the particle coated with the second oxide coating layer and the first oxide, to obtain the modified positive electrode material, wherein the first element of the first oxide is selected from one or more of a group consisting of Si, Ti, V, Zr, Mo, W, Bi, Nb, and Ru, and the salt formed by the second element and a second element of the second oxide are each selected from elements of Group IVB and/or Group VB.

9. The preparation method for the modified positive electrode material according to claim 8, wherein the preparation method for the modified positive electrode material further comprising: performing a first heat treatment after the mechanical fusion treatment, to obtain the modified positive electrode material, while a temperature is 100 to 300° C. and a time of the first heat treatment is 3 to 5 h.

10. The preparation method for the modified positive electrode material according to claim 8, wherein a temperature of the second heat treatment is 200 to 900° C., or 300 to 700° C., and a time of the second heat treatment is 1 to 20 h, or 3 to 12 h.

11. The preparation method for the modified positive electrode material according to claim 8, wherein a metal element of a second metal salt is selected from one or more of a group consisting of Ti, V, and Zr.

12. The preparation method for the modified positive electrode material according to claim 8, wherein the modified positive electrode material is obtained through a first heat treatment after the mechanical fusion treatment, while a temperature of the first heat treatment is 100 to 300° C., and a time of the first heat treatment is 3 to 5 h.

13. A lithium ion battery, comprising a positive electrode, wherein the positive electrode comprises the modified positive electrode material according to claim 1.

* * * * *